C. G. WHITAKER.
AUTOMATIC LATHE.
APPLICATION FILED SEPT. 10, 1919.

1,366,757.

Patented Jan. 25, 1921.
7 SHEETS—SHEET 1.

FIG. 1

C. G. WHITAKER.
AUTOMATIC LATHE.
APPLICATION FILED SEPT. 10, 1919.

1,366,757.

Patented Jan. 25, 1921.
7 SHEETS—SHEET 2.

FIG. 4

C. G. WHITAKER.
AUTOMATIC LATHE.
APPLICATION FILED SEPT. 10, 1919.

1,366,757.

Patented Jan. 25, 1921.
7 SHEETS—SHEET 5.

Inventor-
Charles Godfrey Whitaker,
By B. Singer, Atty.

UNITED STATES PATENT OFFICE.

CHARLES GODFREY WHITAKER, OF LOWER RICCARTON, CHRISTCHURCH, NEW ZEALAND.

AUTOMATIC LATHE.

1,366,757.  Specification of Letters Patent.  Patented Jan. 25, 1921.

Application filed September 10, 1919. Serial No. 322,966.

*To all whom it may concern:*

Be it known that I, CHARLES GODFREY WHITAKER, subject of the King of Great Britain, residing at 34 Edinburgh street, Lower Riccarton, Christchurch, New Zealand, have invented a new and useful Improved Automatic Lathe; and I do hereby declare the following to be a full, clear, and exact description of the same.

This invention relates to automatic lathes, especially of the turret type, and it has been devised with the object of providing an improved construction embodying special advantages over the machines of this class now in existence. The new construction particularly provides for a grouping of the parts of the machine and the mechanism for operating it such that a minimum of space is occupied by the machine, enabling a number of machines being grouped in a battery and all operated from a single actuating shaft running through the whole battery. The machine has other advantages in the matter of cost of construction and simplicity of its parts and their operation that will be hereinafter referred to with respect to a full description of the machine.

The principal features of novelty in the present machine relate to the manner of mounting the turret operating drum in relation to the work spindle, the manner of constructing and arranging the turret arm in relation to the said work spindle and cam drum, and also the means for actuating such turret arm to cause its tool carrier to position the several tools in turn to operate upon the work and to move each of such tools along the work at the desired speed and in the required manner. Other features of the invention relate to special means for actuating the cam drum at two different speeds, controlled by the movements of the turret arm, the utilization of such turret arm movements for the feeding of the work stock through the machine, and to means for cutting off the work. Certain additional features of novelty, as well as those referred to will be hereinafter fully explained with reference to the accompanying sheet of drawings.

The drawings illustrate the complete machine and its detail parts, and in such drawings:—

Fig. 2 is a side elevation thereof.
Fig. 2ᴬ is a small detail view.
Fig. 6ᴬ is a longitudinal section of the back end of the turret arm.
Fig. 9 is a detail sectional view taken on the line 9—9 of Fig. 7.
Fig. 13 is a cross section on the line 13—13 of Fig. 6 and looking to the left of such line.

The machine is mounted in a stand 20 having the bearing heads 21 and 22 extending upwardly from the front and back ends respectively. Journaled in such heads is the hollow work spindle 23 extending longitudinally through them and made generally upon the lines of the hollow spindles of automatic lathes already existing. The spindle is provided with the usual expanding collet 24 at its forward end and mounted in it is the feed tube 25 having the work feeding finger 26 on its forward end. This tube slides to and fro within the spindle and feeds the work stock passed through it, out through the front of the machine on the usual principle but by special means to be afterward explained.

Mounted in the heads in lines parallel with the spindle 23, are the turret arm 27 and the cut off tool spindle 28. The turret arm extends at its forward end through the front head 21 and has mounted thereon the turret head 29. This head is formed of approved cross sectional shape to provide the number of peripheral faces to accommodate the number of tools to be applied to the work, in addition to two idler faces for a purpose to be explained. In the drawings, the head is shown as of hexagonal form and the arm also for a portion of its length is made with a similar number of flat faces. The turret arm is adapted to be turned to cause any one of the tool faces of its head to be opposite the work spindle and each of these faces is constructed to receive and hold the desired tool. In the operation of the machine, the head is moved to and fro along the work projecting from the work spindle, and between each of such complete movements, is given a proportion of a rotation requisite to bring the next face of the head in the working position. In order that the head will be accurately positioned and held from any turning movement in each of its positions, it is formed with a number of holes 30 bored through its length at points equidistant apart and at equal distances from the center and also equaling in number the faces of the head. A pin 31 is fixed to extend forward from the front of the head 21 and this pin is made of a size to accurately fit each of the holes 30. When the head moves out to its maximum distance the pin frees the head so that it may then be turned to the new position which will bring the next hole 30 in front of the pin so that as the head travels in again, such hole will pass over the pin and thereby prevent any turning of the head during the travel inward and any easing away of the tool from its work.

In this invention the cam drum 32 for imparting the longitudinal traveling movement to the turret arm and head, is mounted on the spindle 23 between the lathe heads 21 and 22 so as to be free to turn thereon independently of the rotation of the spindle. The said drum is furnished on its periphery with cam strips 33 secured thereon and of the necessary shapes and pitches to impart the desired movements to the turret arm when the drum rotates and the cam engages cam roller pins 34 extending radially from the turret arm. Each flat face of the turret arm may be furnished with one of these pins so that as the corresponding face of the turret head is turned into operative position a pin will be turned into the position to be engaged by a cam on the drum and thereby move the arm and turret in and out in the required manner. The cam strips are made removable and may be carried at will to suit different circumstances and work to be done and will preferably be so pitched as to give a slow inward working travel to the arm and head and a quick outward travel. The cam pins may also be adjustably mounted on the turret arm.

The cam drum is designed to make one complete rotation for each complete back and forth movement of the turret head, and as each rotation is completed, to impart the necessary partial rotation to such head.

Figure 5:
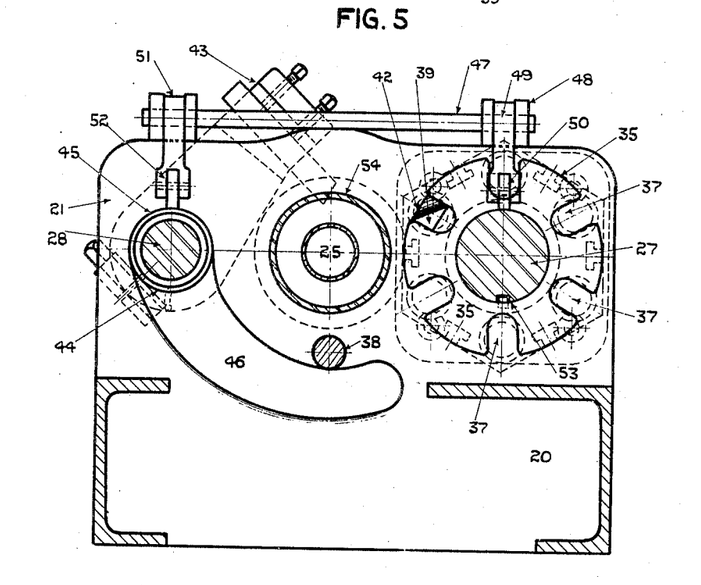
Fig. 5 is a cross sectional elevation taken on the line 5—5 of Fig. 1 and looking toward the front end of the machine.
Figures 5, 6:
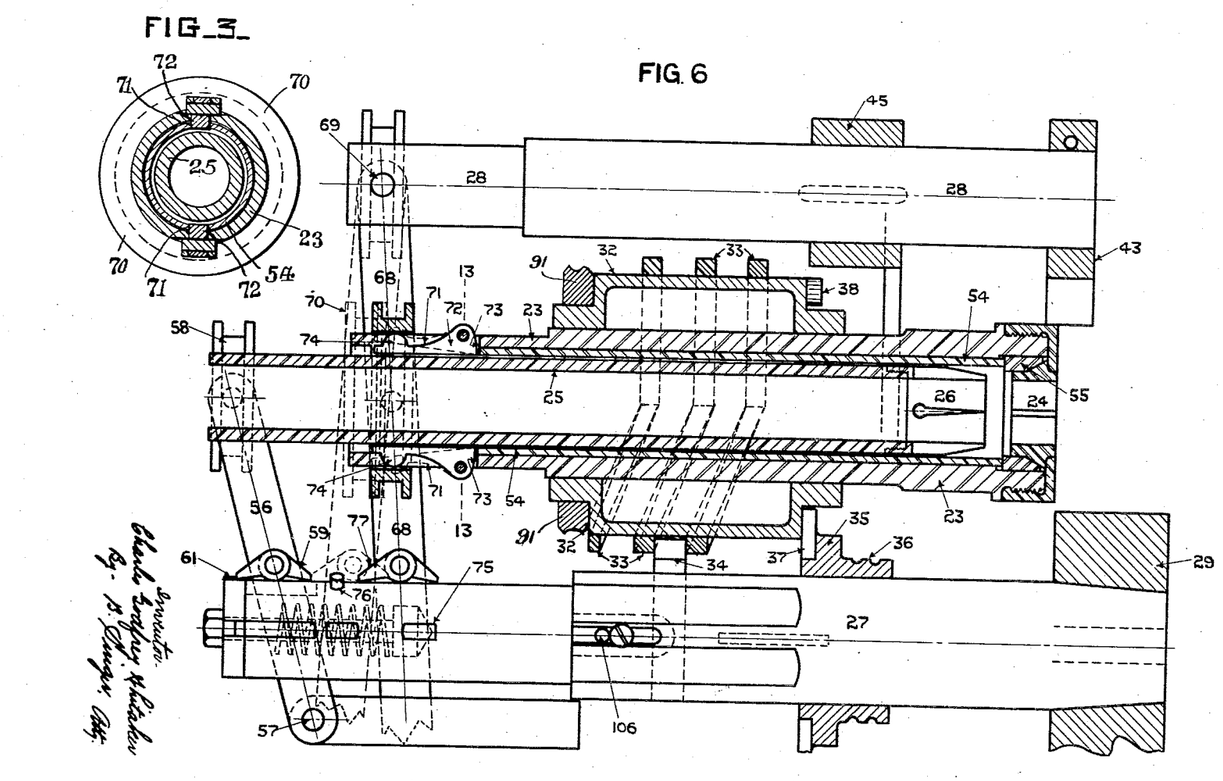
Fig. 6 is a longitudinal sectional plan of the machine work spindle and the operating cam drum showing also the relative positions of the turret arm and dividing tool arm and their inter-relative parts, such view being on an enlarged distinct scale from the other views.
Figure 7:
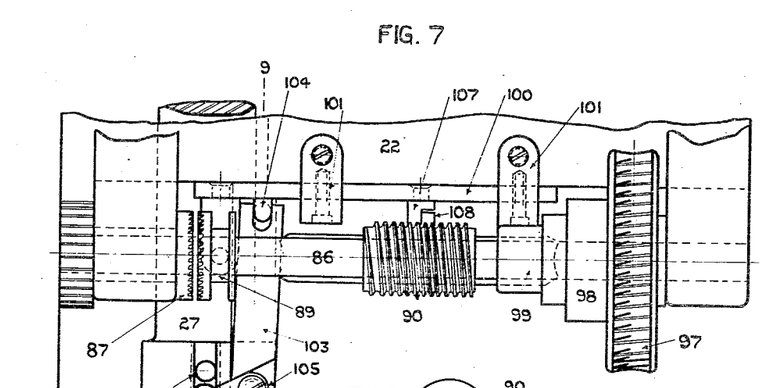
Fig. 7 is a plan, and
Fig. 8 a longitudinal sectional elevation of the cam drum driving means.
Figures 8, 9:
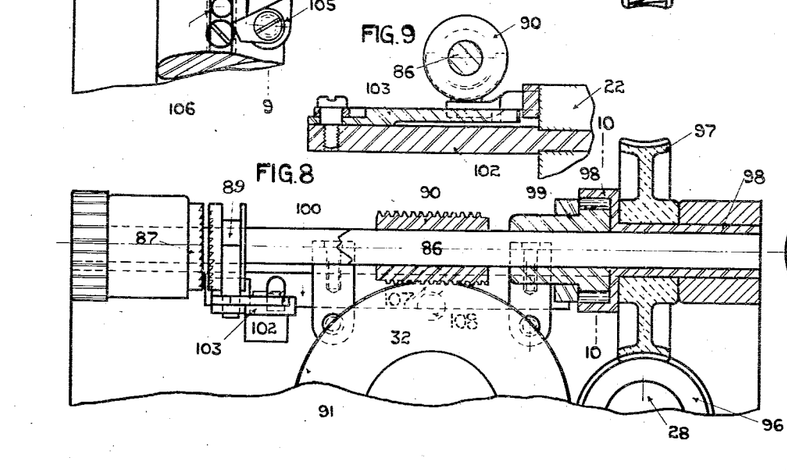
Figure 10:
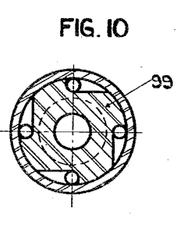
Fig. 10 is a cross section of a free wheel clutch mechanism taken on the line 10—10 of Fig. 8.

The means for effecting this object are more particularly shown in Figs. 5 and 6. A disk plate 35 is mounted on the turret arm just inside the head 21 and is locked to rotate with the arm, but not to move with the longitudinal movements thereof, by the agency of a feather key. This disk plate is made with a boss 36 which is journaled in the head 21 and in effect forms the wearing bush for the arm bearing in such head. The periphery of the disk is formed with a number of deep notches 37 therein equaling in number the number of faces of the turret head and spaced equidistant apart around such periphery. The edge of the disk overlaps the front end of the drum 32 and projecting forwardly from such end, is a roller pin 38 (shown in section in Figs. 5 and 11). This pin, as the drum rotates is adapted to engage with one of the notches in the disk and turn the disk and turret arm with it, a proportion of a rotation equal to the proportion required to bring the next face of the turret head into operative position. Each rotation of the drum will therefore impart this proportional rotation to the turret arm. The position of the pin 38 is naturally adjusted with relation to that of the cam strips 33 so that the engagement of the pin with the disk and the turning of the turret arm takes place when the turret head is at its outward limit of movement and free from the retaining or positioning pin 31.

Figure 11:
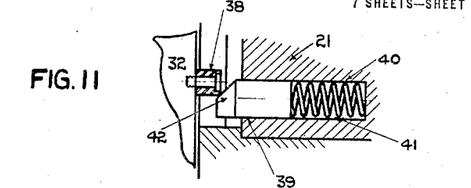
Fig. 11 is a detail view of a turret arm locking means.

In order that the disk will be locked from further movement after being turned the required amount and thus to accurately position the holes 30 of the turret head to pass on to the pin 31, a detaining pawl 39 is provided to engage in the notches as each one turns to its new position. This pawl, a detail of which is shown in Fig. 11, is mounted in a recess 40 in the head 21, behind the disk, and consists in a plunger fitting within such recess and normally pressed outward by means of a cushion spring 41 in the bottom of the recess. The outer end of the plunger is squared to fit the notches 37 and it is also formed with an inclined face 42 extending in the line of the rotation of the drum pin 38. The pawl is positioned to fit within the notch next to be engaged by the said drum pin and this pin as it enters such notch engages the inclined face 42 and by such engagement pushes the pin back clear of the notch so that the pin may enter and the disk be rotated, the pawl then springing out and into the next notch, as such notch comes around opposite it and holding the disk and turret arm in the required manner.

Figure 1:
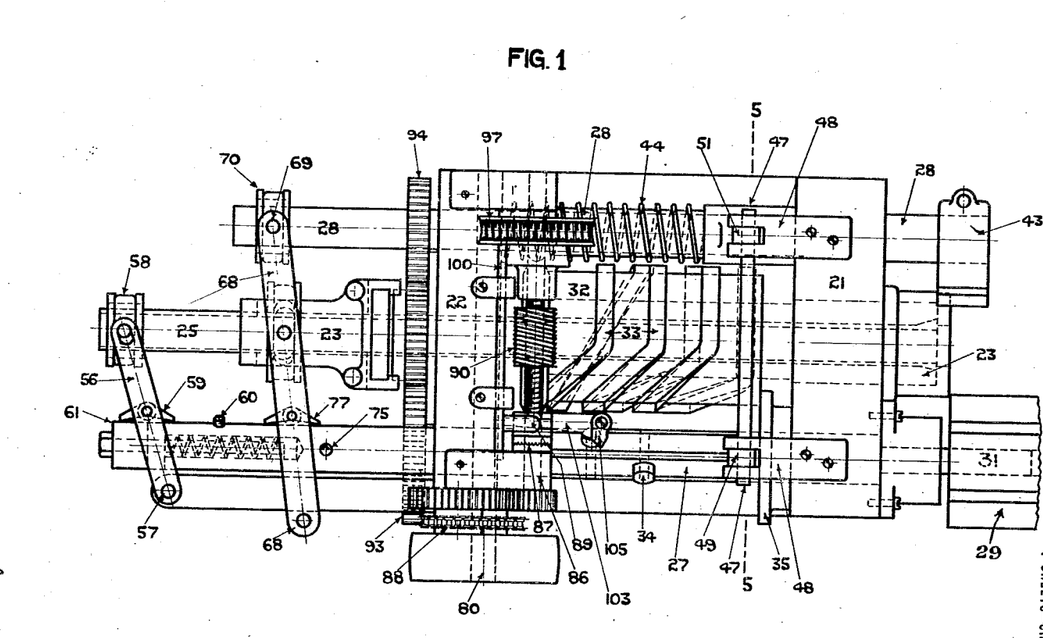
Figure 1 is a plan of the machine.

The cut off tool spindle 28, at its forward end, carries the tool arm 43 of approved shape to receive and hold the required tool, and adapted to be swung in and down across the front face of the head 21 to engage the work in the lathe. This tool arm is kept normally raised in the position shown in Fig. 3 by means of a combined torsion and compression spring 44 (Figs. 1 and 5) surrounding the spindle between the heads 21 and 22 and having its ends secured respectively to the head 22 and to a boss 45 feather keyed on the spindle and suitably tensioned to turn the spindle and to lift and hold the arm up. The boss 45 forms the boss of a cam arm 46 (Fig. 5) that curves inward and downward between the head 21 and the forward end of the cam drum. This cam is maintained normally by means of the spring 44 pressed forward against the head 21 and out of the line of rotation of the roller pin 38 but it is adapted, at the proper time, to be pressed backward so that it will lie in the line of rotation of such pin so as to be engaged thereby. It is also so shaped that as the drum rotates and the pin engages the top face of the cam arm it will move the arm outward the necessary amount to turn the parting tool arm 43 in and down the required amount to cause the tool to pass across the work in the lathe. Then as the pin 38 leaves the cam arm, the arm will be moved back to its normal position to cause the tool arm to be raised again, through the agency of the spring 44. To allow for this sliding movement of the cam boss 45 upon the spindle 28 the said boss is provided with a feather key attachment to the spindle in the well known way. These movements of the cut off tool arm are designed to take place at the proper sequence in the operations of the turret head 29 and the tools carried thereby so as to be actuated at the end of the working operations of such tools. They are therefore governed by the sliding movement of the turret arm 27 as it moves back on the last of its working movements. The means for effecting this consist in a rocking spindle 47 that is carried in bearings 48 secured upon the top of the head 21 so that such spindle extends along parallel with the head. At one end of the spindle a lever 49 is secured, such lever extending downward and having a roller 50 mounted in its bottom that rests lightly on the surface of the turret arm, as shown clearly in Figs. 2 and 5. A similar lever 51 is secured to the other end of the spindle 47 and it also is furnished with a roller 52 journaled in its lower end. This lever extends down inside the head 21 and lies in between such head and the boss 45 of the cam arm 46 so that when the spindle is turned to turn such arm rearward, its roller will engage the said boss and force it back against the spring 44 to cause the arm 46 to be positioned to be engaged by the drum roller pin 38 and operated in the required manner. This turning movement of the spindle is obtained through the agency of a flat cam plate 53 (Figs. 2ᴬ and 5) that extends longitudinally along the turret arm 27 at the point in its periphery coming to the top when the said turret arm has been turned through its several working movements. The back end of this cam as the turret arm moves back, is designed to engage beneath the roller 50 of the lever 49 thereby tilting such lever backward and giving a corresponding movement to the lever 51.

In this invention also, special means for operating the feeding of the work stock through the feed tube 25 as required, have been embodied, such means being operated by the agency of two complete backward and forward movements of the turret arm 27. These means are shown in the detail views Figs. 6, 6ᴬ, and 13 and also in the general views Figs. 1, 2, and 4.

Positioned between the work spindle 23 and the feed tube 25 is a sliding sleeve 54 extending to the front end of the work spindle and at its front end engaging the back of the wedging collar 55 fitting around the expanding collet 24 in the manner already well known in the art so that a forward movement of the sleeve will close the collet on to the work stock projecting forwardly from the work spindle, and a rearward movement of the sleeve will permit the collet to open and free its grip upon such stock. These features of construction and the principle of operation have been embodied in previous machines of this class and form no novel features in the present invention.

The said two complete movements of the turret arm before mentioned, are adapted to perform the following sequence of operations:—On the first backward movement (which will also coincide with the movement to operate the cutting off tool) the feed tube will be drawn back over the work stock which remains grasped by the collet. The turret arm then moves idly forward, is given its partial rotation at its forward limit, and then on its next backward movement opens the collet. Finally on its next forward movement it carries the feed tube forward so as to feed the work stock through the necessary amount and at the finish of such movement closes the collet on the work stock, so that the tools in the turret head may be brought in their proper sequence, into operation upon the work held rigidly in the work spindle.

Figures 2, 2A, 6A:
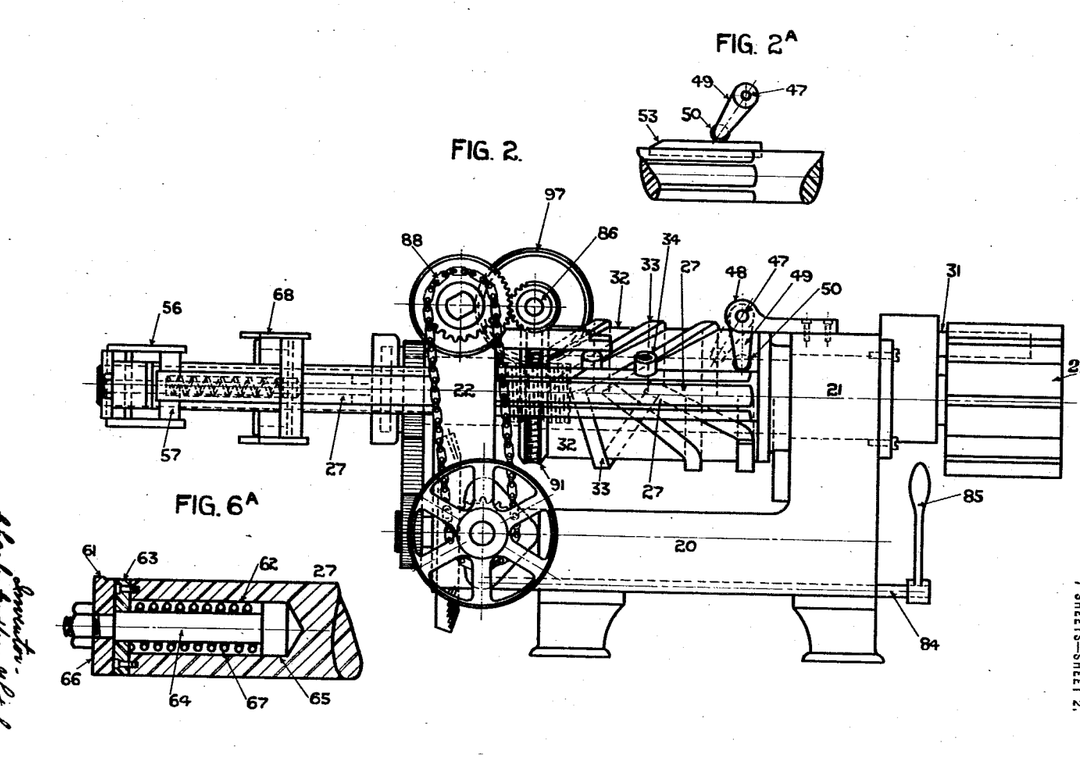
Figure 3:
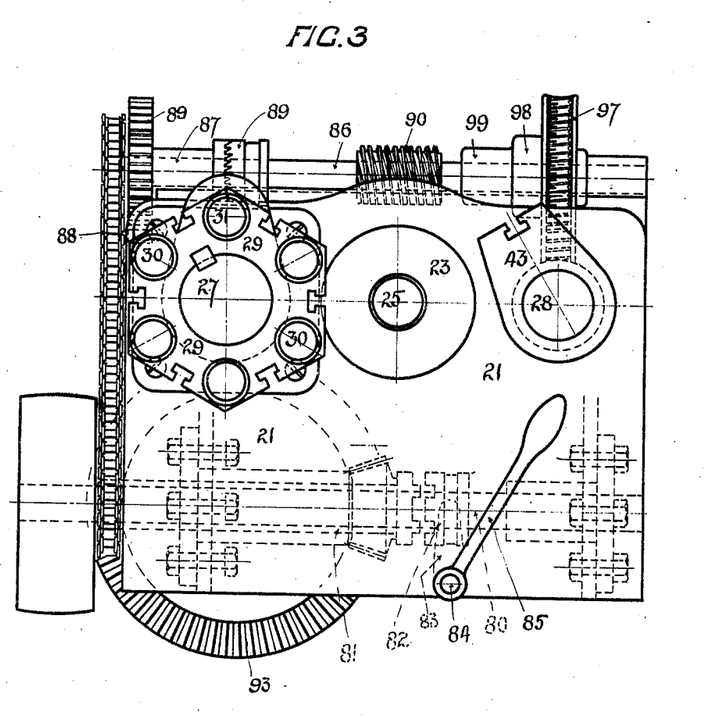
Fig. 3 is a front elevation.

These movements of the feed tube are effected by means of a double lever 56 passing respectively above and below the turret arm and the feed tube, which lever is pivoted to a fixture 57 on the outside of the turret arm and at its other end is caused to engage a grooved collar 58 on the back end of the feed tube, which will permit the said tube to freely rotate, but through which the turning movements of the lever will cause the feed tube to slide back and forth. A double pawl 59 is pivoted between the members of the lever 56 so that its two teeth extend forward and rearward in contact with the surface of the turret arm. A stop piece 60 is fitted to project from the turret arm in a position to engage the forward tooth of the pawl, as the turret arm moves rearward on the first movement of the series referred to and by such engagement to carry the lever back and draw the feed tube rearward. This stop piece 60 is adjustable to the required position to obtain the necessary amount of movement of the feed tube. A second stop 61 is fixed on the back end of the turret arm in a position such as to be turned into the line of contact with the pawl when the turret arm is given the next partial rotation at the end of the forward idle movement referred to. This stop piece 60 as the turret arm moves forward on the next forward movement, engages the back tooth of the pawl 59 and draws the lever forward so as to carry the feed tube with it. In order, however, that the forward movement of the feed tube shall be definitely effected and the same movement of the turret arm will close the collet, the back end of the turret arm is preferably constructed as shown in Fig. 6ᴬ. The back end of the turret arm is bored centrally to form a bore 62 and such bore is closed by a nut 63 that loosely surrounds a pin 64 extending in through it and along the bore. This pin at its forward end is formed with a head 65 and at its rear end is attached to a block 66 upon which the stop piece 61 is formed. A spring 67 surrounds the pin 64 within the bore such spring being in compression between the nut 63 and the head 65.

Consequently as the turret arm moves forward and the pin 61 engages the pawl 59, the end of the lever 56 attached to the collar on the feed tube 25 will move forward until the collar 58 comes in contact with the end of the work spindle 23 when being restrained from further forward movement the spring 67 will be compressed allowing the plate 66 with the pin 61 to remain stationary while the turret arm completes its forward movement in which part of its movement it closes the collet as hereafter described. Then, as the turret arm is given its turning movement at the extreme limits of its forward movement and the stop 61 is turned free of the pawl, the parts will resume their normal positions.

The movements of the sleeve 54 to free and close the collet 24 are effected through the agency of a second double lever 68 that passes across the top and bottom of the work spindle 23 and the turret arm and which is pivoted to a grooved collar 69 on the cut off tool spindle 28. This lever is connected to a grooved collar 70 mounted to move longitudinally on the work spindle with the movements of the lever 68, while permitting the spindle to rotate freely. The said spindle is formed with two slots 71 formed to extend longitudinally in it at points diametrically opposite one another and within each of such slots, near its forward end, is pivoted a cam lever 72 that extends along within the slot. This cam lever is pivoted at its forward end and such end is shaped as a heel 73 that when the lever is extending longitudinally within its slot, engages the end of the collet closing sleeve 54 and forces such sleeve forward, and when the back end of the lever is turned out, will free such sleeve end so that the collet may open and push the sleeve back. The rear end of each cam lever 72 is formed on its outer face with a curved knob 74 over which the grooved collar 70 is adapted to pass so as to turn the lever in, when such collar is moved forward. The movements of the collar 70 are designed to move rearward to free the knobs 74 of the two levers, so that they may swing out on their pivots as shown by the dotted lines in Fig. 6, and forward so as to engage the curved knobs and force the levers in, as shown by the full lines in such figure. The desired movements of the sleeve 54 are thereby obtained.

These movements of the collar 70 are obtained by the to and fro movements of the lever 68 under the action of the turret arm as it moves backward and forward on the second of the two complete movements already referred to. This is effected by providing the turret arm with stops 75 and 76 fitted to it at the necessary point in its periphery to lie in the line to engage a double pawl 77 on the lever 68 having its two teeth engaging the edge of the turret arm and extending respectively forward and rearward thereon. One of these stops 75 is adapted to engage the forward tooth of the pawl and push the lever rearward as the turret arm moves back and the other, 76, is adapted to engage the back tooth of the pawl and to push the lever forward as the turret arm moves forward again. This latter stop is so positioned that its engagement with the pawl will take place as the forward movement of the feed tube 25 ceases.

These stops 75 and 76, as well as the stop 60 for operating the feed tube lever 56, are made adjustable in any approved manner so that the effectual timing of their operations may be adjusted.

These two complete movements of the turret arm are arranged to coincide with the positioning of the two idle faces of the turret head opposite the work in the lathe.

Figure 12:
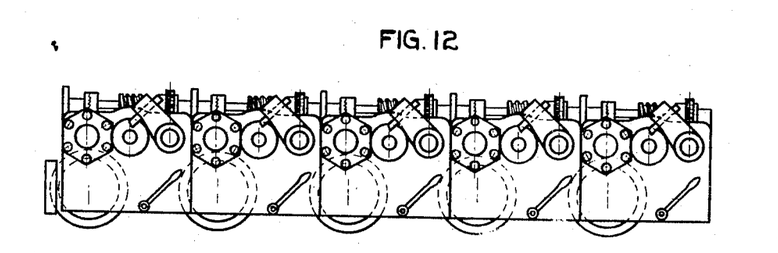
Fig. 12 is a front elevation of a battery of five machines grouped in the manner facilitated by this invention.

The lathe is driven from a power shaft 80 extending transversely in suitable bearings across within its lower part and receiving its rotation from any suitable power source. The general construction of the lathe will permit of a number of machines being arranged one alongside the other, in a battery, as shown in Fig. 12, and all operated by a common power shaft extending through them all. Thus all extraneous belting, shafts and pulleys are dispensed with and the machines grouped into a minimum of space so that economy in space is obtained and the care of a number of machines by the one operator greatly facilitated.

The power shaft 80 runs normally free but is adapted to be clutched to a sleeve 81 by means of the clutch 82 operated by a lever 83 on the rear end of a rod 84 extending to the front of the machine and having a handle 85 on its end for turning it. The machine may thus be stopped or started from the front by operating this lever.

A countershaft 86 is mounted across the top of the head 22 and carried in suitable bearings thereon. On one end of this countershaft is mounted a clutch sleeve 87 that gears with the sleeve 81 through the chain and sprocket gearing 88, or other suitable gearing. A sliding clutch 89 is mounted on the said countershaft and is adapted to engage or free the clutch sleeve 87 to cause the countershaft to rotate through the agency of the gearing 88. A worm pinion 90 is also mounted on the countershaft to rotate therewith and this pinion gears with a worm wheel 91 on the cam drum 32 so as to drive the drum upon the spindle 23.

The said countershaft is adapted to have two different speeds imparted to it and for such speeds to be controlled automatically by the longitudinal movements of the turret arm so that the forward idle movement of such arm may be carried out by a relatively quick travel of the cam drum during the position of its rotation concerned and the backward working movement of the arm may be effected slowly by a slower rate of travel of the corresponding portion of the drum's rotation.

The first quick travel of the drum is caused by the locking of the countershaft 86 with the gearing 88, and the slower travel of the drum is effected by the rotation of the countershaft through special gearing with the driving sleeve 81 upon the power shaft, such gearing also driving the work spindle 23. Means are also provided for the automatic control of such gearing to effect the desired changes at the proper times.

Figure 4:
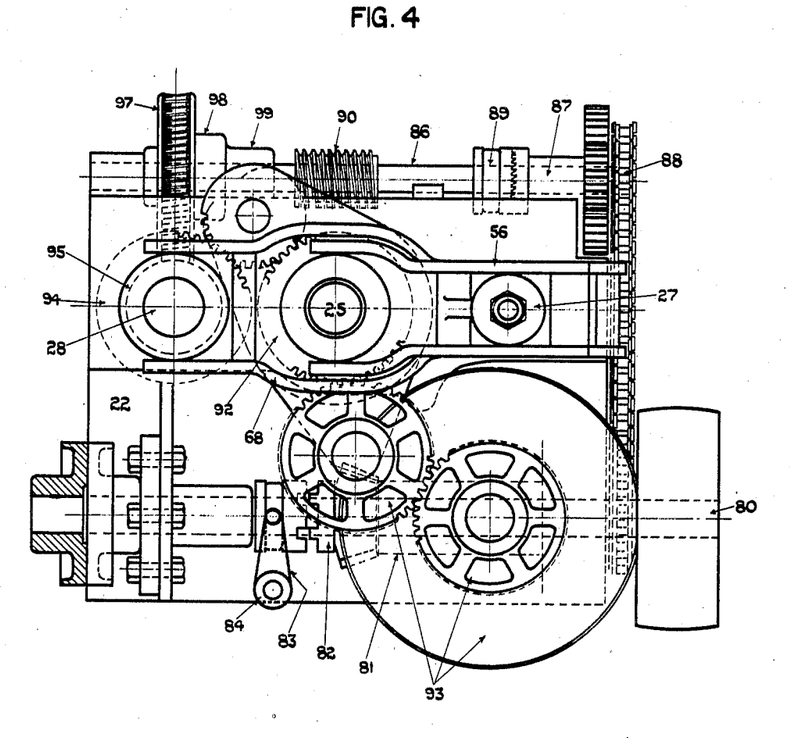
Fig. 4 a back end elevation of the machine.

This gearing is shown more particularly in Fig. 4 and the detail Figs. 7 to 10. The sleeve 81 is geared with a gear wheel 92 on the back end of the work spindle 23 through the train of gear wheels 93 so as to drive such spindle at the required rate. This pinion wheel 92 in turn drives a pinion 94 upon a sleeve 95 loose on the parting tool spindle 28, and which sleeve has a worm 96 secured upon it, that gears with a large worm wheel 97 mounted upon a sleeve 98 loose upon the countershaft. The rate of rotation of the worm wheel is therefore geared down to a much slower speed than that of the clutch sleeve 87 also upon the countershaft. This sleeve 98 by free wheel mechanism 99 of approved design (such as that shown in the drawings) is in constant driving gear with the countershaft. The free wheel mechanism is so designed that when the countershaft is locked to the clutch sleeve 87 it may rotate freely ahead of the rotation of the worm sleeve 98 and when such countershaft is freed from the clutch sleeve, it will drive the countershaft at the relatively lower speed. The two speeds for the countershaft, and consequently the cam drum, are thus provided for.

The movement of the clutch 89 into and out of gear is carried out automatically by the movements of the turret arm, at some point in its backward movement, and by the rotation of the drum respectively. For these purposes the clutch is operated by means of a bar 100 mounted in guides 101 on the head 22, to slide longitudinally parallel with the countershaft and is suitably connected to the said clutch. A fixed arm 102 extends forwardly from the said head, above the turret arm and on the forward end of this arm, a lever 103 is pivoted, such lever at its rear end being forked and positioned so that its forks engage a block 104 on the bar 100 between them. Upon the top of the pivot point of the lever is journaled a spring pawl 105 that is so mounted as to turn forwardly freely without moving the lever, but when turned back to turn the lever to one side in correspondence. The turret arm is provided with a number of pins 106 projecting radially from it, one for each position assumed by the said arm in its rotation, and each of these pins comes into the position to engage the spring pawl 105 as the turret arm moves backward. On its forward movement the pin will pass idly over the pawl, but on its backward movement, it will engage such pawl turning it and the lever 103 before it passes over it. The pawl and the lever are so adjusted that the amount and direction of turning movement will be such as to move the clutch 89 out of mesh with the clutch sleeve 87 and thereby permit the countershaft to be driven slowly through the gearing 92—99. The pins 106 are made adjustable in position and are so adjusted that they will operate the lever 103 at any determined point of the backward travel of the turret arm, for instance as such movement commences.

The movement of the bar 100 to throw the clutch 89 into mesh is effected by means of a pin 107 on the bar, and a pin 108 on the back end of the worm wheel 91 so positioned that as the cam drum finishes the portion of its rotation to move the turret arm backward, it will engage the pin 107 and move the bar 100 across and then pass on beneath such pin. The said bar will then be positioned to operate the clutches 87—89 causing the shaft 86 to drive the drum at fast speed for the return movement of the turret arm.

It will be apparent that the various parts and operating means going to make up the complete lathe may all be accurately timed to work in their proper relation to one another and in the necessary sequence, so that after the initial feeding of the work stock into the back end of the machine and the proper arrangement of the correct tools in the turret head, the machine, after it has been thrown into gear with the driving shaft, will carry out its functions automatically until the work stock is exhausted.

The different driving gear wheels are made removable and interchangeable so that with a constant rate of rotation of the main power shaft, the rate of rotation of the work spindle and the relative rate of rotation of the cam drum may be varied at will. This provision for the changing of the gear wheels will allow for the rate of working movement of the turret head remaining constant no matter at what rate the work spindle and the work held therein is rotated.

I claim:—

1. In automatic lathes, a work carrying spindle, a cam drum loosely mounted on such spindle, means for conveying rotation to the said spindle and to the cam drum, a turret carrying arm mounted in parallel plane with the said work spindle, and means whereby the movements of the said cam drum will convey reciprocating longitudinal and rotary movement to the turret carrying arm, substantially for the purposes specified.

2. In automatic lathes, the combination with a work carrying spindle and a turret tool carrying arm disposed in a parallel plane with the work spindle, of a cam drum loosely mounted upon the work spindle and having cam plates on its periphery, cam pins extending radially from the turret arm and engaging with such cam-plates and means for conveying rotation to the said drum and to the work spindle, substantially as specified.

3. In automatic lathes, a work spindle, a cam drum mounted to rotate on such work spindle, a turret carrying arm operated to move longitudinally to and fro by the said cam drum, means for automatically conveying variable speeds to the to and fro movements of the turret arm by varying the rate of rotation of the drum, and adjustable stops upon the turret arm for controlling such means, substantially as specified.

4. In automatic lathes, a work spindle, a turret carrying arm mounted in a parallel plane with such spindle, a drum mounted loosely upon the said work spindle, cams of variable pitch attached to the periphery of the said cam and drum and connections between the said turret arm and the cams, whereby the rotations of the drum will convey to and fro longitudinal movement to the turret arm at suitable speeds, substantially as specified.

5. In automatic lathes, the combination with a work carrying spindle and a turret tool carrying arm disposed to move backward and forward in a parallel plane with the work spindle, of a cam drum loosely mounted upon the work spindle, cam plates secured upon the periphery of the drum, cam pins extending radially from the turret arm at different points in its periphery, and adapted by the turning of the turret arm to engage with the said cam plates, a roller tooth on the forward end of the cam drum, a disk plate mounted on the turret arm so as to rotate therewith but to permit of the turret arm moving through it, such disk plate having a number of notches at intervals in its periphery adapted in turn to be engaged by the roller tooth on the drum on each rotation thereof, and means for conveying rotation to the cam drum and to the work spindle, substantially as specified.

6. In automatic lathes, a hollow work spindle having means for feeding the work stock through it and means at its forward end for gripping such stock, in combination with a cam drum loosely mounted upon the work spindle and having cam plates secured upon its periphery, a turret tool carrying arm mounted to slide longitudinally to and fro in a parallel plane with the tool spindle and having cam pins projecting radially therefrom adapted to be engaged by the said cam plates, means for conveying rotation to the cam drum and to the work spindle and means whereby the longitudinal movements of the turret arm will actuate the work stock feeding and gripping mechanism in the work spindle, substantially as specified.

7. In automatic lathes, the combination with a hollow work spindle having means for feeding the work stock through it and for gripping such stock therein, of a cam drum mounted loosely upon the work spindle, a turret arm mounted to slide longitudinally to and fro in a parallel plane with the work spindle, a tool carrying turret head on the forward end of such turret arm, having means for the attachment of tools to extend radially at different points of its edge, means whereby each rotation of the said cam drum will impart a proportion of a rotation to the turret arm, cam pins upon the turret arm extending radially at points corresponding with the respective tool attachments to the turret head, and cam plates upon the cam drum disposed to engage each of such cam pins in turn as the turret arm is given its proportional rotatory movements, and so shaped as to impart a complete backward and forward sliding movement to the turret arm on each rotation of the cam drum, substantially as specified.

8. In automatic lathes, constructed as described in claim 7, means for holding the turret head from rotation between each proportional rotatory movement of the turret arm such means consisting in forming the turret head with a number of apertures extending through it in lines parallel with its axis and equidistant from such axis and a pin fixed to extend forward from the lathe in the line of such apertures so as to enter one of them upon each backward movement of the head and to free the head as it reaches the limit of its forward movement, substantially as specified.

9. In automatic lathes constructed as herein described, in combination with a work spindle, a turret tool carrying arm disposed in a plane parallel with such spindle, a cam drum loosely mounted on the work spindle, means for imparting separate rotation to the cam drum and the work spindle, connections between the cam drum and the turret arm whereby each complete rotation of the drum will impart a proportional partial rotation to the turret arm, and a spring controlled locking pawl adapted to normally engage the said turret arm and to hold it at the end of each of its rotatory movements, substantially as and for the purposes specified.

10. In automatic lathes, a work spindle, a turret tool carrying arm mounted in a parallel plane with such work spindle and adapted to slide longitudinally to and fro, a cam drum loosely mounted on the work spindle, cam pins extending radially from the turret arm, cam plates secured upon the cam drum, adapted to engage with the said cam pins and shaped so that on each complete rotation of the cam drum the turret arm is moved backward and forward, a power driving shaft, connections between the power shaft and the work spindle, a countershaft geared to the cam drum, direct driving connection between the power shaft and the countershaft, a clutch controlling such connection, intermediate slower speed driving connections between the power shaft and the countershaft and means whereby at the commencement of the forward movement of the turret arm the rotation of the cam drum will operate the clutch to connect the countershaft with the direct driving connection, and on the backward movement of the turret arm will release the clutch from the direct driving connection, substantially as and for the purposes specified.

11. In automatic lathes, a work spindle, a cam drum mounted loosely on such work spindle, a turret tool carrying arm mounted to slide longitudinally to and fro in a plane parallel with the tool spindle and operated by the rotation of the cam drum, a cut off tool spindle also mounted in a plane parallel with the turret arm, a tool carrier on its forward end adapted when the spindle is turned to pass across the front end of the work spindle, a cam arm mounted on the parting tool spindle to slide thereon but to rotate therewith, a spring normally turning such cam arm to raise the tool carrier above the work spindle and also pressing the cam arm forward, a cam roller upon the forward end of the cam drum passing behind the cam arm when the cam arm is in its normal position but adapted to engage and turn it when the cam arm is moved rearward, and means whereby one of the series of backward movements of the turret arm will move the said cam arm to its rear position, substantially as specified.

12. In automatic lathes constructed as described in claim 12, means for moving the said cam arm rearward consisting in a rocking shaft extending transversely above the cut off tool spindle and the turret arm, a lever secured to one end of the said rocking shaft and positioned in front of the said cam arm, a lever secured to the other end of the rocking shaft and positioned to lie in the central line of movement of the turret arm, with its free end resting on such arm, and a cam plate arranged to extend longitudinally along the turret arm and to project beyond its surface and adapted to engage the corresponding lever end and turn it rearward, substantially as specified.

13. In automatic lathes, a lathe bed, a hollow work spindle extending longitudinally therein, a work stock feeding tube extending through the said spindle, a turret tool carrying arm mounted to slide longitudinally in the lathe bed in a line parallel with the work spindle, a cam drum mounted loosely on the work spindle, operative connections between the said cam drum and the turret arm whereby each rotation of the drum will impart a rearward and forward movement to the turret arm, a power driving shaft extending transversely in the lathe bed and driving connections between such shaft and the cam drum and work spindle respectively, substantially as specified.

14. In automatic lathes, a hollow work spindle having a work gripping collet at its forward end and a stock feed tube mounted to move longitudinally within it, a turret carrying arm mounted in a parallel plane with the said work spindle, means for moving such turret carrying arm longitudinally to and fro, and means whereby such movements will operate the stock feed tube and mechanism for closing the collet, substantially as specified.

15. In automatic lathes, a hollow work spindle having a work gripping collet at its forward end, a sleeve mounted to slide within the spindle and by its forward movement to close the collet and by its rearward movement to open the collet, a work stock feed tube arranged within such sleeve and adapted to be moved to and fro therein so as to feed the work stock through the collet, a cam drum mounted loosely on the work spindle, means for the independent rotation of the work spindle and the cam drum, a turret arm mounted to slide longitudinally to and fro in a line parallel with the work spindle, connections between the cam drum and the turret arm by which a complete rotation of the cam drum will impart a rearward and forward movement to the turret arm and also a proportion of a rotation at the end of the forward movement thereof, a lever pivoted on the back end of the machine overlying the turret arm and connected to the feed tube, a second lever pivoted to the back end of the machine, overlying the turret arm and connected to a sliding collar mounted on the work spindle, a pair of cam levers mounted in the said spindle and at their forward ends bearing against the back end of the collet closing sleeve and at their rear ends inclosed by such sliding collar, curved cam faces on the outer sides of such cam levers and stop pieces on the turret arm positioned to engage the first and second levers respectively on two successive rearward movements of the turret arm and to engage both levers on the forward movement succeeding the second rearward movement, substantially as and for the purposes herein specified.

16. In automatic lathes constructed as described in claim 15, adjustable stop pieces on the turret arm for operating the stock feed and collet actuating levers, substantially as specified.

In testimony whereof, I have signed this specification in the presence of two subscribing witnesses.

CHARLES GODFREY WHITAKER.

Witnesses:
W. ALEXANDER,
M. LAVENDALE.